United States Patent
Spiel et al.

(10) Patent No.: US 9,900,164 B2
(45) Date of Patent: Feb. 20, 2018

(54) DYNAMIC POWER MANAGEMENT

(71) Applicant: Cisco Technology, Inc., San Jose, CA (US)

(72) Inventors: Seth Brandon Spiel, San Francisco, CA (US); Morgan Davis Teachworth, Campbell, CA (US); Ian Matthew Snyder, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 29 days.

(21) Appl. No.: 14/736,061

(22) Filed: Jun. 10, 2015

(65) Prior Publication Data

US 2016/0363980 A1    Dec. 15, 2016

(51) Int. Cl.
*G06F 1/00*    (2006.01)
*H04L 12/10*    (2006.01)
*G06F 1/32*    (2006.01)

(52) U.S. Cl.
CPC ............ *H04L 12/10* (2013.01); *G06F 1/3206* (2013.01); *G06F 1/324* (2013.01); *G06F 1/3209* (2013.01)

(58) Field of Classification Search
CPC ........... G06F 1/28; G06F 1/329; G06F 1/3287
USPC ................ 713/300, 320, 340, 322; 370/352; 324/642, 533, 641
See application file for complete search history.

(56) References Cited

U.S. PATENT DOCUMENTS

| | | | |
|---|---|---|---|
| 5,245,291 A | 9/1993 | Fujimura | |
| 6,438,163 B1 | 8/2002 | Raghavan et al. | |
| 6,980,007 B1 * | 12/2005 | Lo | G01R 31/083 324/533 |
| 7,353,407 B2 * | 4/2008 | Diab | H04L 12/10 713/300 |
| 7,404,091 B1 * | 7/2008 | Gere | H04L 12/10 713/300 |
| 7,469,348 B2 * | 12/2008 | Camagna | H03F 1/02 324/641 |
| 7,650,519 B1 * | 1/2010 | Hobbs | G06F 1/266 713/300 |
| 7,814,340 B2 * | 10/2010 | Heath | H04L 12/10 700/286 |
| 8,106,530 B2 * | 1/2012 | Schindler | H02J 1/14 307/35 |
| 8,228,074 B2 * | 7/2012 | Lin | H04L 12/2697 324/642 |
| 8,670,335 B2 | 3/2014 | Barkan et al. | |
| 8,793,511 B1 * | 7/2014 | Bishara | G06F 1/266 713/300 |
| 2006/0218418 A1 * | 9/2006 | Camagna | H04L 12/10 713/300 |

(Continued)

OTHER PUBLICATIONS

Cisco Systems, Inc., "IEEE 802.3az Energy Efficient Ethernet: Build Greener Networks," White Paper, 2011, 9 pages.

*Primary Examiner* — Aurel Prifti
(74) *Attorney, Agent, or Firm* — Ronald S. Fernando

(57) ABSTRACT

In one embodiment, a method includes: obtaining a power loss value for a cable that couples a device to a power source, where the power loss value is indicative of an amount of power lost through the cable during power transmission from the power source to the device; and determining, based at least in part on the power loss value for the cable, a power budget value indicative of an amount of power received by the device from the power source.

20 Claims, 11 Drawing Sheets

(56) References Cited

U.S. PATENT DOCUMENTS

| | | | | |
|---|---|---|---|---|
| 2007/0041387 A1* | 2/2007 | Ghoshal | H04L 12/10 | 370/395.52 |
| 2008/0129118 A1* | 6/2008 | Diab | H04L 12/10 | 307/35 |
| 2008/0172564 A1* | 7/2008 | Diab | H04L 12/10 | 713/300 |
| 2008/0238634 A1* | 10/2008 | Diab | G01K 7/00 | 340/538 |
| 2008/0263373 A1* | 10/2008 | Meier | G06F 9/3017 | 713/300 |
| 2009/0083552 A1* | 3/2009 | Hussain | H04L 12/10 | 713/300 |
| 2009/0119523 A1* | 5/2009 | Totten | G06F 1/32 | 713/322 |
| 2009/0210725 A1* | 8/2009 | Kim | H04L 12/10 | 713/300 |
| 2010/0162024 A1* | 6/2010 | Kuris | G06F 11/3062 | 713/340 |
| 2010/0262850 A1* | 10/2010 | Lin | H04L 43/0817 | 713/320 |
| 2011/0258465 A1* | 10/2011 | Diab | H04L 12/10 | 713/300 |
| 2012/0317426 A1* | 12/2012 | Hunter, Jr. | H04L 12/10 | 713/300 |
| 2013/0315080 A1* | 11/2013 | Diab | H04L 41/0823 | 370/252 |
| 2013/0339760 A1* | 12/2013 | Zimmerman | G06F 1/26 | 713/300 |
| 2014/0245031 A1* | 8/2014 | Hamdi | G06F 1/266 | 713/300 |
| 2014/0289544 A1 | 9/2014 | Bailey | | |
| 2015/0121113 A1* | 4/2015 | Ramamurthy | H02J 9/061 | 713/340 |
| 2015/0358810 A1* | 12/2015 | Chao | H04W 4/001 | 455/418 |
| 2016/0054774 A1* | 2/2016 | Song | G06F 1/3203 | 713/320 |

* cited by examiner

DYNAMIC POWER MANAGEMENT

TECHNICAL FIELD

The present disclosure relates generally to power management and transmission, and in particular, to systems, methods and apparatuses enabling dynamic power management of an operating device.

BACKGROUND

The ongoing development, maintenance, and expansion of data networks often involves incorporating additional functionality into and enabling greater connectivity with previously deployed equipment, in addition to deploying new networking equipment. The transmission media by which devices are connected may allow for the communication of data between devices and, in some instances, also allow for the transmission of power between devices. The simplification of using the same cable (and input/output ports) for transmission of both data and power between devices may enhance the user experience.

Powering devices via a transmission media rather than an independent power source presents a number of challenges. For example, the amount of power received via a transmission media which also carries data may be significantly less than the amount of power that may be drawn from a dedicated power source such as a wall outlet. Thus, a device that draws power via such a transmission medium may have a reduced power budget and may not be able to perform the same number of functions as an independently powered device within that power budget or may not be able to provide the same level of performance of performed functions that an independently powered device may provide.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
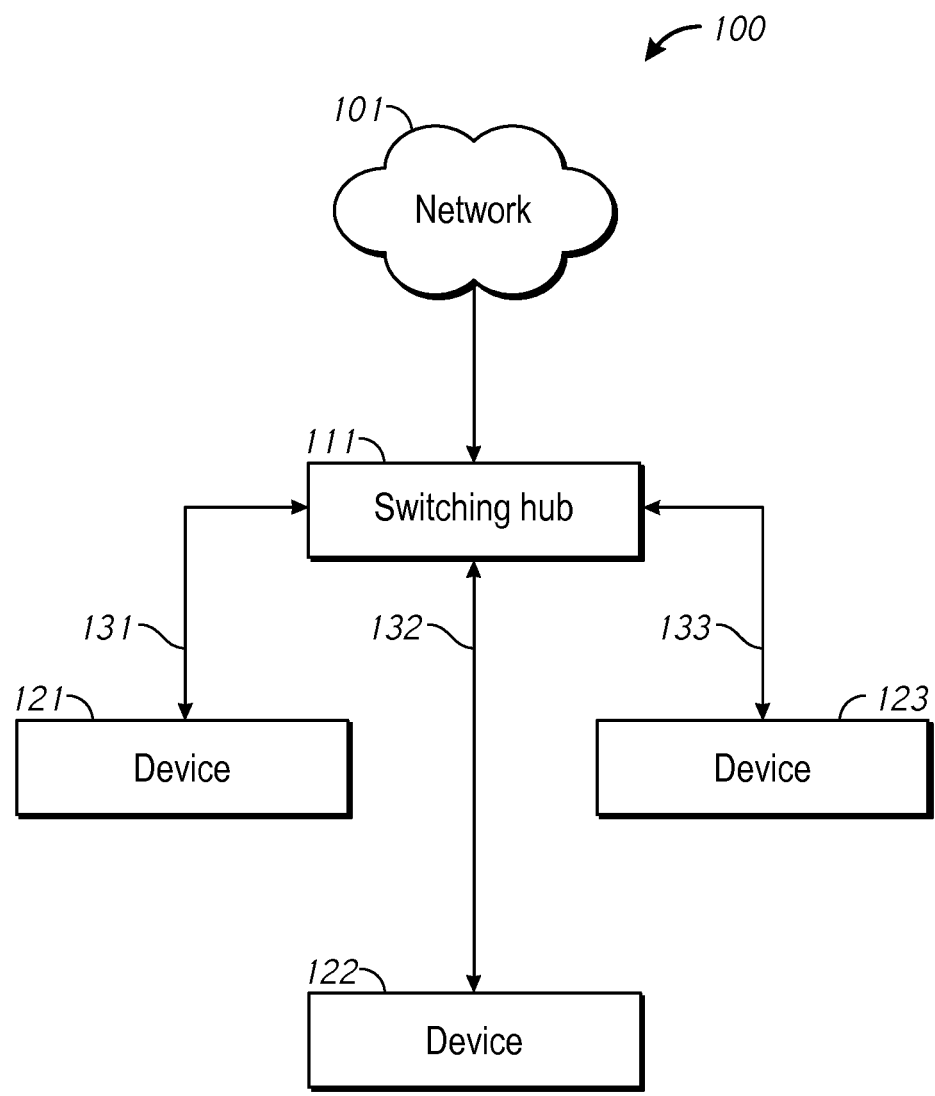
FIG. 1 is a block diagram of a data network in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for dynamically managing power consumed by a device. For example, in some implementations, a method includes: obtaining, at a device, a power loss value for a cable that couples the device to a power source, where the power loss value is indicative of an amount of power lost through the cable during power transmission from the power source to the device; and determining, based at least in part on the power loss value for the cable, a power budget value indicative of an amount of power received by the device from the power source. For example, in other implementations, a method includes: obtaining, at a power source, a power loss value for a cable that couples the power source to a device, where the power loss value is indicative of an amount of power lost through the cable during power transmission from the power source to the device; determining, based at least in part on the power loss value for the cable, a power budget value indicative of an amount of power delivered to the device by the power source; and providing an indication of the power budget value to the device.

Example Embodiments

When operating a device, numerous factors determine the functions or features that may be enabled before the amount of power that would be consumed by the device is greater than that available, risking failure of the device. For example, workload, manufacturing versions, environmental factors, mounting methods, and usage can affect the power consumed by a device with a particular set of functions enabled. Product developers may design a device with reduced performance and/or functionality to compensate for worst-case scenarios and ensure that there is a large enough safety margin between power available and power consumed to avoid failure of the device.

When power is received via a transmission media which also carries data, the amount of power available to a device may be significantly less than the amount of power that may be drawn from a dedicated power source. For example, a wireless access point deriving power via an Ethernet cable using the IEEE (Institute of Electrical and Electronics Engineers) 802.3af standard may, in order to fit within the power budget, have a significantly reduced feature set as compared to a wireless access point deriving power from another source. Similarly, products with multi-gigabit Ethernet, multiple radios, or second-generation IEEE 802.11ac radios may have difficulty fitting under the larger power budget of the IEEE 802.3at standard.

In some implementations, power consumption is monitored (or estimated) and controlled to safely reduce the difference between power available and power consumed by selectively enabling or disabling functions during runtime. For example, in some implementations, a power control module determines the amount of power available to a device and the amount of power consumed by the device during operation of the device. Based on the difference between these amounts, the power control module may select one or more functions of the device and enable (or disable) the functions. In some implementations, the amount of power available to the device is based at least in part on a power standard in accordance with which the device sources power and also a power loss value for a cable that couples the device to the power source.

Determining the amount of power consumed by the device and determining which functions of the device to enable or disable may be based on information from a number of different sources. For example, the power control module may base its determinations on inputs from a memory storing manufacturing or empirical test data, hardware sensors of the device, a module producing predictive information about the computational workload of a user of the device, the Internet, and/or closed databases of network and device statistics such as that of a cloud-based controller. These inputs may be used to intelligently remove the safety margin built into the power and thermal budget of a device, allowing it to reach higher levels of performance than would otherwise be possible. In particular, using information from hardware sensors of the device in parallel with information from a cloud-based controller architecture may make it possible to deliver an enhanced user.

FIG. 1 is a block diagram of a data network 100 in accordance with some implementations. The data network 100 includes a switching hub 111 that couples a number of devices 121-123 to a network 101. The network 101 may include any public or private LAN (local area network) and/or WAN (wide area network), such as an intranet, an extranet, a virtual private network, and/or portions of the Internet. In some implementations, one or more of the devices 121-123 are physical devices including hardware and software for performing one or more functions. Example physical devices include, without limitation, network routers, wireless access points, IP (internet protocol) cameras, VoIP (Voice-over-IP) phones, intercoms and public address systems, clocks, sensors, access controllers (e.g., keycard readers), lighting controllers, security systems, building management systems, or the like. In some implementations, one or more of the devices 121-123 may be virtual devices that consume power through the use of underlying hardware.

The switching hub 111 (which may also be referred to as a network switch, a bridging hub, or a MAC [media access control] bridge) receives and transmits data between the network 101 and the devices 121-123. In some implementations, the switching hub 111 manages the flow of data of the data network 100 by transmitting messages received from the network 101 to the devices 121-123 for which the messages are intended. In some implementations, each of the devices 121-123 coupled to the switching hub 111 is identified by a MAC address.

The switching hub 111 is communicatively coupled to each of the devices 121-123 via respective transmission media 131-133, which may be wired or wireless. In some implementations, the switching hub 111, in addition to receiving and transmitting data via the transmission media 131-133, provides power to the devices 121-123 via the transmission media 131-133. For example, in some implementations, the switching hub 111 is coupled to the devices 121-123 via an Ethernet cable. In some implementations, the switching hub 111 provides power to the devices 121-123 on unused conductors of the cable or by applying a common-mode voltage to each pair of conductors of the cable.

In some implementations, the switching hub 111 provides power to the devices 121-123 via the Ethernet cable according to a Power-over-Ethernet (PoE) standard. In some implementations, the switching hub 111 provides power to the devices 121-123 according to the IEEE 802.3af standard. For example, in some implementations, the switching hub 111 outputs 15.4 W of power to each of the devices 121-123. Due to power loss caused by the resistance of the Ethernet cable, each of the devices 121-123 may receive less than 15.4 W of power. For example, each of the devices 121-123 may receive as little as 12.95 W of power. In some implementations, the switching hub 111 provides power to the devices 121-123 according to other PoE standards such as IEEE 802.3at or IEEE 802.3bt. In some implementations, the switching hub 111 provides power to the devices 121-123 via other types of transmission media 131-133, such as a USB (Universal Serial Bus) cable, or an IEEE 1394 (FIREWIRE) cable.

Figure 2A:
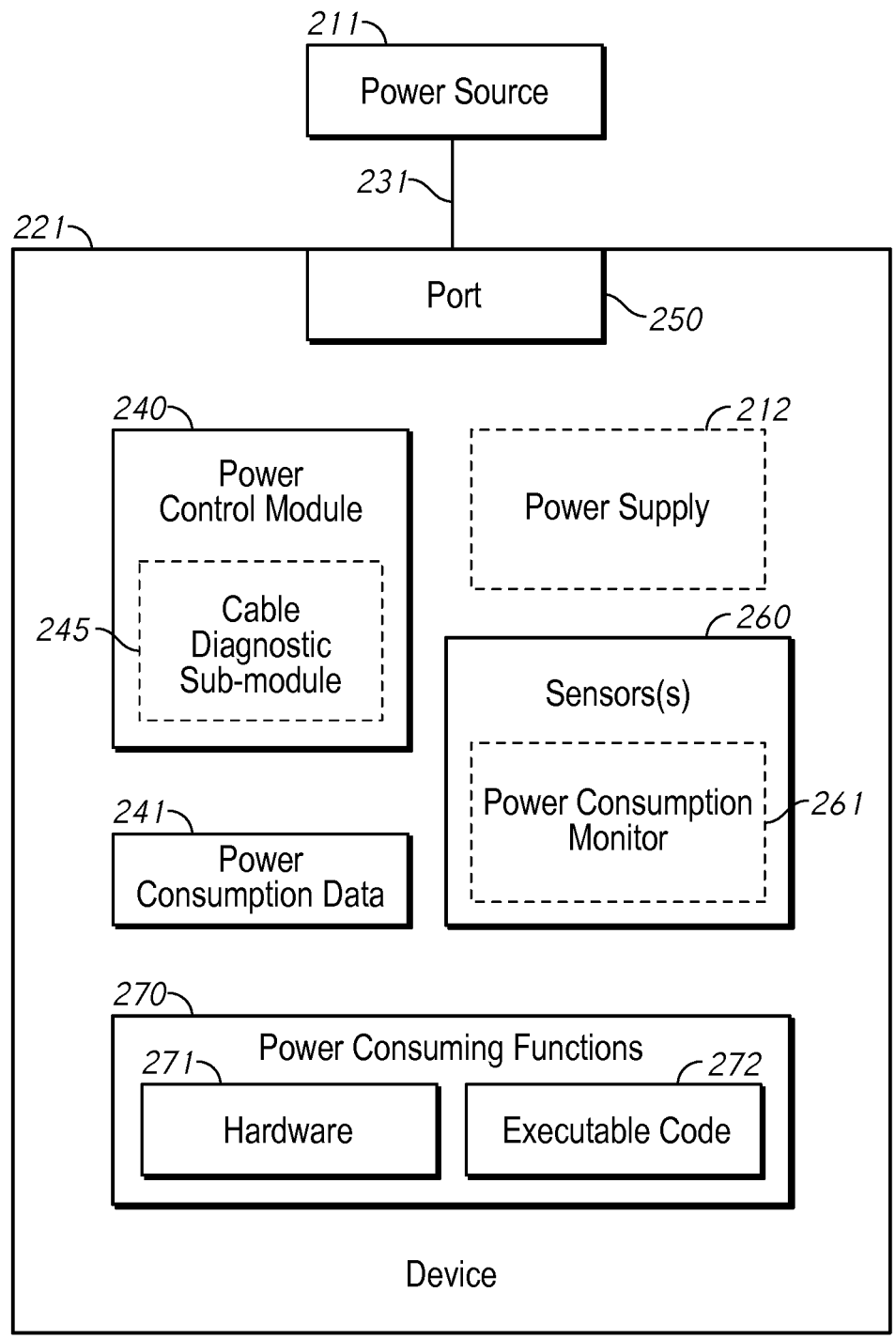
FIG. 2A is a block diagram of a device in accordance with some implementations.

FIG. 2A is a block diagram of a device 221 coupled to a power source 211 in accordance with some implementations. The device 221 may correspond to any of the devices 121-123 of FIG. 1, and the power source 211 may correspond to the switching hub 111 of FIG. 1.

The device 221 includes a port 250 for receiving power from the power source 211 via a transmission medium 231. The transmission media 231 may be a wired or wireless transmission medium. In some implementations, the transmission medium 231, in addition to providing power to the device 221, carries data from and to the device 221. Similarly, in some implementations, the port 250, in addition to receiving power from the power source 211, receives and transmits data. Although the power source 211 is shown as external to the device 221 in FIG. 2A, it is to be appreciated that aspects of the disclosure may be used in implementations in which the device 221 includes an optional internal power supply 212 such as one or more batteries. In some implementations, the transmission medium 231 is, for example, an Ethernet cable and the port 250 is an Ethernet port. In some implementations, the port 250 is a USB port or an IEEE 1394 (FIREWIRE) port for receiving a USB cable or an IEEE 1394 (FIREWIRE) cable, respectively.

The device 221 includes a power control module 240 that selectively enables and disables power consuming functions 270 of the device. The power consuming functions 270 may include hardware 271 and/or executable code 272. For example, in some implementations, the hardware 271 includes backup 2.4 GHz or 5.0 GHz radios, interference scanning radios, BLUETOOTH/BLUETOOTH Low Energy radios, or additional data ports (e.g., USB or Ethernet ports).

In some implementations, the executable code 272 includes software for performing one or more functions such as processing client traffic, security functionality, or spectral analysis.

In some implementations, the power consuming functions 270 include enhanced versions of other power consuming functions 270, particularly of core power consuming functions 270. For example, in some implementations, the power consuming functions 270 include increased data throughput, additional RF (radio frequency) transmit/receive chains, modulation/coding schemes, transmit power, high bandwidth Ethernet modes, increased CPU (central processing unit) frequency, increased memory frequency, increased memory refresh rates, an increased number of active memory banks, and/or increased system bus frequencies. Thus, in some implementations, enabling (or disabling) a power consuming function 270 includes increasing or decreasing a hardware or software parameter such as CPU frequency.

In some implementations, the power control module 240 selectively enables and disables the power consuming functions 270 based on an amount of power received from the power source 211 and/or the amount of power consumed by the device 221. For example, according to the IEEE 802.3af standard, the device 221 may expect to receive 12.95 W of power via an Ethernet cable. In reality, the device 211 may be able to draw more power via the cable, particularly if the cable is short or of high quality. For example, the device 211 may be able to draw up to 13.87 W from a Category 5 cable, a 7.1% increase in the amount of power drawn compared to a Category 3 cable. In response to obtaining an indication that the cable is lower loss than typical and consequently the amount of power available is greater than 12.95 W, the power control module 240 may enable additional power consuming functions 270. Similarly, the device 221 may be expected (or designed) to consume 12.5 W of power during operation with a particular set of power consuming functions 270 enabled. In response to determining that the device 221, in operation with the set of power consuming functions 270 enabled, is consuming less than 12.5 W of power, the power control module 240 may enable additional power consuming functions 270.

In some implementations, the power control module 240 determines the amount of power available to the device 221 from the power source 211 in a number of ways. In some implementations, the power control module 240 determines the amount of power available to the device 221 based on a signal obtained from the power source 211 via the port 250. In some implementations, the signal encodes a value indicative of an amount of power available to the device (e.g., in watts). In some implementations, the signal encodes a flag indicative of a power standard (e.g., IEEE 802.3af or IEEE 802.3at) employed by the power source 211 in delivering power to the device 221.

In some implementations, the power control module 240 includes a cable diagnostic sub-module 245 (e.g., including a power sensor) configured to determine a power loss value for a cable or similar transmission medium (e.g., the transmission medium 231). In some implementations, the diagnostic sub-module 245 is configured to perform a diagnostic test that identifies one or more characteristics of the cable including, without limitation, a length of the cable, a resistance value of the cable, an insertion loss value of the cable, and a return loss value of the cable. In some implementations, the power loss value is a function of the one or more characteristics of the cable. In some implementations, the power control module 240 determines an adjusted amount of power available to the device 221 (i.e., the amount of power received by the device 221 from the power source 211) based on the signal from the power source 211 and the power loss value determined by the cable diagnostic sub-module 245.

In some implementations, the power control module 240 also determines the amount of power consumed by the device 221 in a number of ways. In some implementations, the power control module 240 determines the amount of power consumed by the device 221 using data indicative of actual power consumption (by the device 221 or similar devices), rather than the amount of power the device 221 was designed to consume. In some implementations, the device 221 includes one or more sensors 260 which generate data that may be used by the power control module 240 to determine the amount of power consumed by the device 221. Although the sensors 260 are illustrated separately from the power consuming functions 270 in FIG. 2A, it is to be appreciated that the sensors 260 and/or their operation may themselves be power consuming functions.

In some implementations, the one or more sensors 260 include an optional power consumption monitor 261 that generates data, such as a monitored value, indicative of the amount of power consumed by the device 221. In some implementations, the power consumption monitor 261 includes, for example, a current drain meter. Although the power control module 240 may determine the amount of power consumed by the device 221 based on information from the power consumption monitor 261 (or multiple power consumption monitors associated with various portions of the device 221), the power control module 240 may determine the amount of power consumed by the device 221 by less direct methods.

In some implementations, the power control module 240 determines the amount of power consumed by the device 221 by accessing power consumption data 241 stored on the device 221 indicative of expected power consumed by the device 221 in various configurations (e.g., by various power consuming functions 270 or having various sets of power consuming functions 270 enabled or disabled). In some implementations, the power consumption data 241 includes manufacturing test data gathered when the device 221 (or a component thereof) was built. In some implementations, the power consumption data 241 includes empirical test data gathered during operation of the device 221.

In some implementations, the power control module 240 determines the amount of power consumed by the device 221 based on information received via the port 250 such as information received from the Internet. In some implementations, the power control module 240 receives information from a database of live, real-time information on the status and history of devices in operation such as a database of a cloud-based controller architecture. For example, the power control module 240 receives information indicating that a particular power consuming function designed to consume approximately 4.0 W typically consumes between 2.1 W and 2.4 W of power. Accordingly, rather than determining the amount of power consumed by the device 221 using the 4.0 W metric for the particular power consuming function, the power control module 240 determines the amount of power consumed by the device 221 assuming that the power consuming function consumes 2.4 W (or, for additional safety against failure, 2.6 W or 3.0 W).

Additional information received via the port 250 that may be used by the power control module 240 to determine the amount of power consumed by the device 221 may include, without limitation, information about special events (e.g., software patches or releases) that may signal computer demand on a piece of hardware, weather forecasts or patterns that may impact the environmental conditions of a piece of hardware and therefore impact its energy budget for computational tasks, upcoming tradeshows/conferences, car traffic or pedestrian data that may allow the prediction of a high concentration of users of the device 221, video streaming statistics, and/or the like.

Thus, as described above, in some implementations, the power control module 240 determines an amount of power available to the device 221 and an amount of power consumed by the device 221. Based on this information, the power control module 240 selectively enables or disables one or more power consuming functions 270 of the device. For example, if the difference between the amount of power available and the amount of power consumed is large, the power control module 240 may enable an additional power consuming function 270 to consume this unused available power. As another example, if the difference between the amount of power available and the amount of power consumed is small, the power control module 240 may disable a power consuming function 270 to provide a safety margin and avoid failure of the device 221 or degradation of performance of other power consuming functions 270, including, but not limited to, core features of the device 221. The power control module 240 may select which power consuming function 270 to enable or disable based on a number of factors as described below.

In some implementations, in order to enable a power consuming function 270 including hardware 271, the power control module 240 enables power received via the port 250 to activate the hardware 271. In some implementations, the power control module 240 actively routes power to the hardware 271, transmits a signal to the hardware 271 to activate it, or transmits a signal to other hardware that enables power to activate the hardware 271. In some implementations, in order to enable a power consuming function 270 including executable code 272, the power control module 240 instructs a processor of the device 221 (of which the power control module 240 may be a part or separate) to execute the executable code 272.

In some implementations, the power control module 240 continuously monitors and controls the amount of power consumed by the device 221 and repeatedly enables or disables power consuming functions 270. For example, in some implementations, the power control module 240 determines an updated amount of power consumed by the device and selectively enables or disables one or more power consuming functions 270 based on the amount of power available (which may also be updated) and the updated amount of power consumed by the device 221.

Figure 2B:
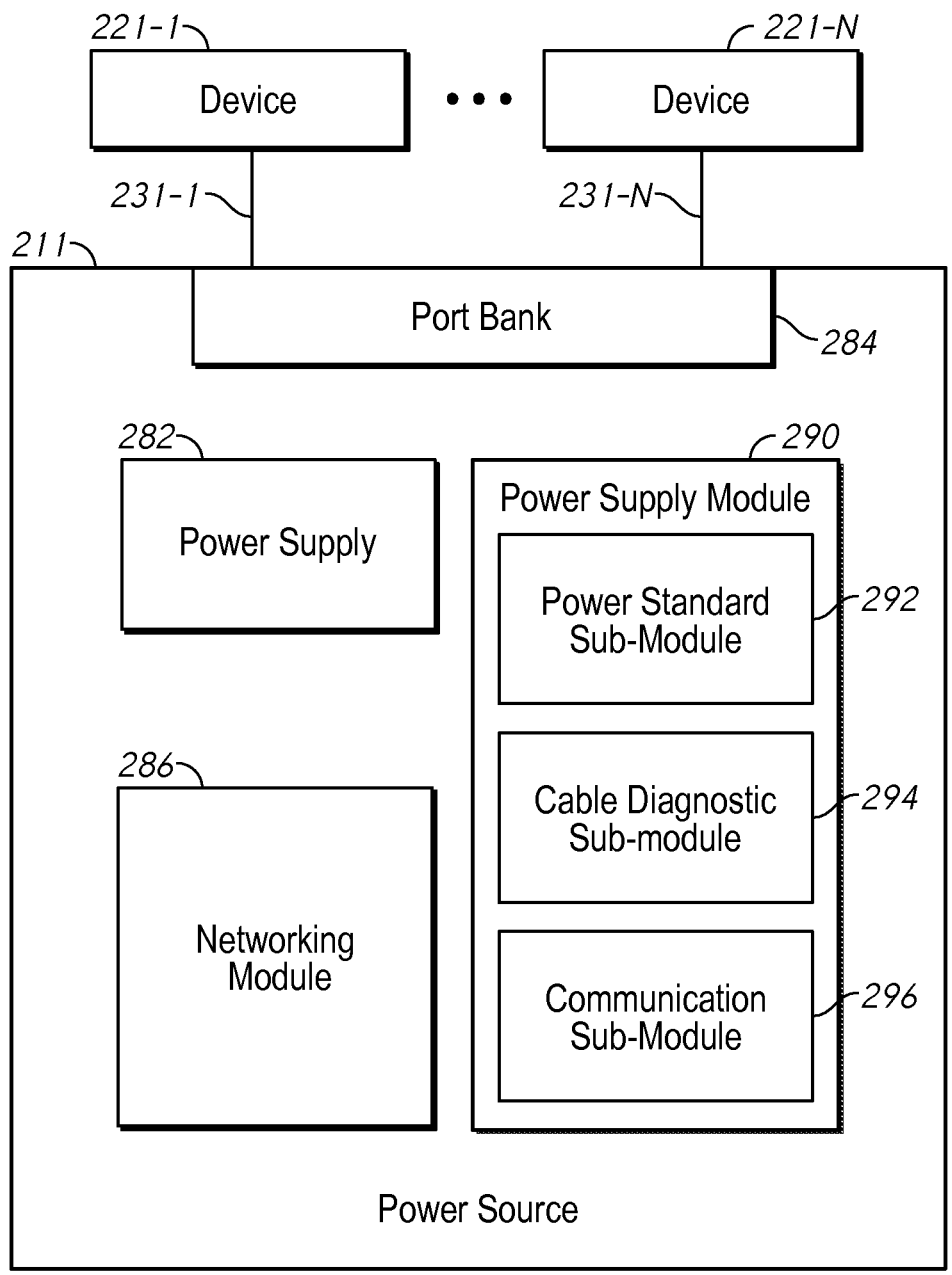
FIG. 2B is a block diagram of a power source in accordance with some implementations.

FIG. 2B is a block diagram of the power source 211 coupled to one or more devices 221-1, . . . , 221-N in accordance with some implementations. The power source 211 may correspond to the switching hub 111 of FIG. 1, and the one or more devices 221-1, . . . , 221-N may correspond to any of the devices 121-123 of FIG. 1.

The one or more devices 221-1, . . . , 221-N are coupled to a port bank 284 of the power source 211 via corresponding transmission media 231-1, . . . , 231-N. For example, the port bank 284 includes 24, 48, or an arbitrary number of ports. In some implementations, the power source 211 includes a power supply 282 configured to deliver power to the components of the power source 211 and the one or more devices 221-1, . . . , 221-N. Additionally, in some implementations, the power source 211 includes networking module 286 configured to route packet traffic to and from the one or more devices 221-1, . . . , 221-N.

The power source 211 also includes a power supply module 290 configured to control the delivery of power from the power supply 282 to the one or more devices 221-1, . . . , 221-N. In some implementations, the power supply module 290 includes a power standard module 292, a cable diagnostic sub-module 294, and a communication sub-module 296.

In some implementations, the power standard sub-module 292 is configured to determine a power standard by which the devices 221-1, . . . , 221-N are able to source power via a transmission medium (e.g., the transmission medium 231). For example, the power standard sub-module 292 detects that a respective device of the one or more devices 221-1, . . . , 221-N is coupled to one of the ports of the port bank 284 via an Ethernet cable and sends a predefined voltage pulse to determine the power standard of the respective device. If the respective device is configured to source power in accordance with a PoE standard, the respective device includes a signature resistor. The signature resistor and the predefined voltage pulse enables the power source 211 to measure a return current value which enables the power source 211 to determine the power standard by which the respective device is able to source power. For example, a respective device that is configured to source power according to IEEE 802.3af has a 1 k$\Omega$ signature resistor. In this example, the power standard sub-module 292 of the power source measures a resulting current of 100 mA, assuming a predefined 10 V pulse. Continuing with this example, the power standard sub-module 292 determines, based on a look-up-table or the like, that the respective device is able to sink 15.4 W of power according to IEEE 802.3af.

In some implementations, the cable diagnostic sub-module 294 is configured to determine a power loss value for a cable (e.g., the transmission medium 231). In some implementations, the cable diagnostic sub-module 294 is configured to perform a diagnostic test that identifies one or more characteristics of the cable including, without limitation, a length of the cable, a resistance value of the cable, an insertion loss value of the cable, and a return loss value of the cable. In some implementations, the power loss value is a function of the one or more characteristics of the cable. In some implementations, the predefined voltage pulse sent by the power standard sub-module 292 to determine the power standard of the respective device is also used to perform the cable diagnostic. In some implementations, a second predefined voltage pulse is sent by the power standard sub-module 292 to perform the cable diagnostic.

In some implementations, the communication sub-module 296 is configured to provide an indication to the respective device of the devices 221-1, . . . , 221-N of the power available from a power source 211. In some implementations, the indication is a signal that encodes one or more of a power budget value indicative of an amount of power (e.g., in watts) available to the respective device, the power standard of the device, and the power loss value of the cable that couples the respective device to the power source 211. In other implementations, the communication sub-module 296 is configured to set a register with a value indicative of power available from the power source 211 which can be read by the respective device of the devices 221-1, . . . , 221-N. In some implementations, the register value encodes one or more of a power budget value indicative of an amount of power (e.g., in watts) available to the respective device, the power standard of the device, and the power loss value of the cable that couples the respective device to the power source 211.

Figure 3:
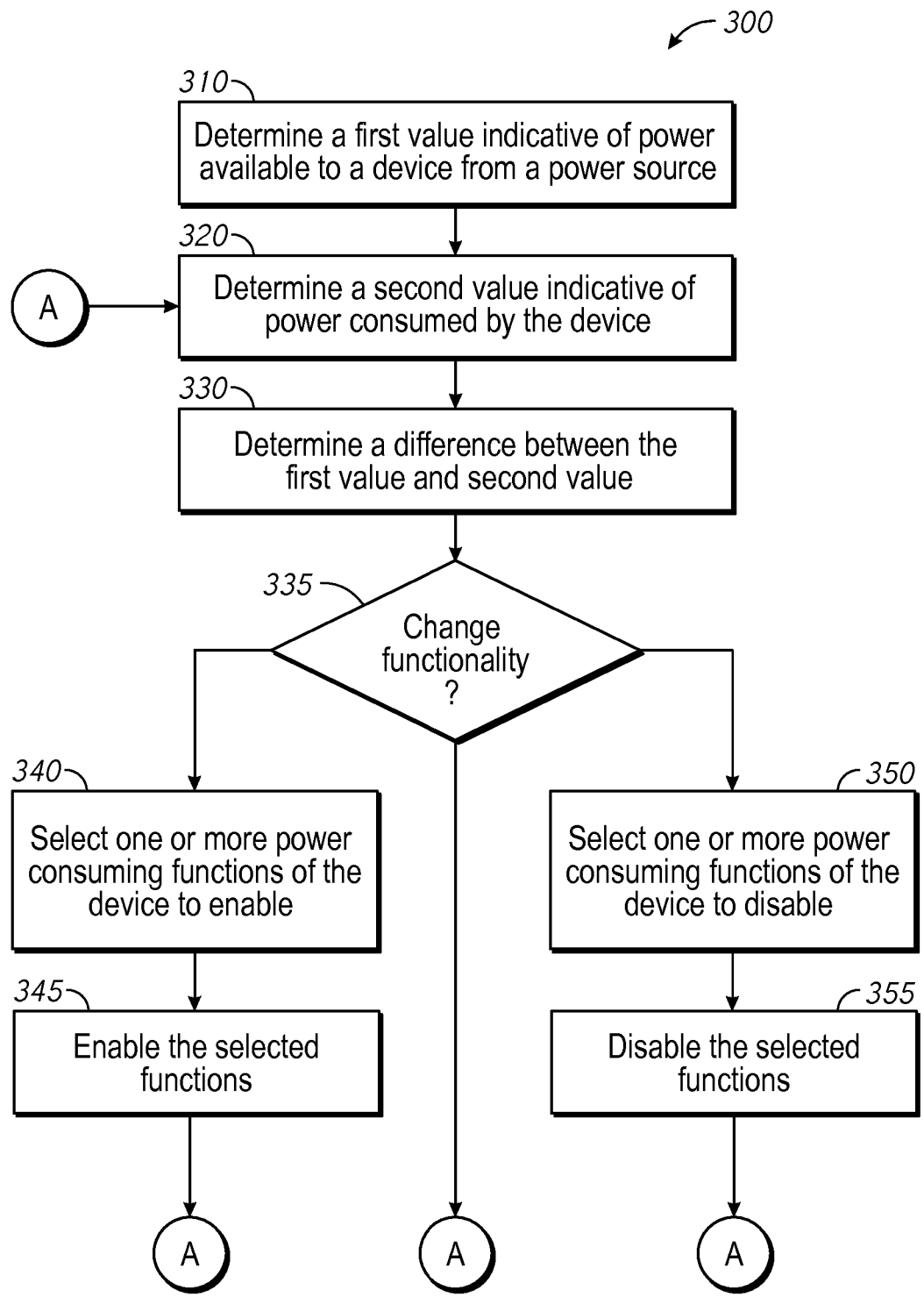
FIG. 3 is a flowchart representation of a method selectively enabling and/or disabling power consuming functions of a device in accordance with some implementations.

FIG. 3 is a flowchart representation of a method 300 of selectively enabling and/or disabling power consuming functions in accordance with some implementations. In some implementations, the method 300 is performed by a power control module of a device such as the power control module 240 of FIG. 2A. In some implementations, the method 300 is performed by processing logic, including a suitable combination of hardware, firmware, and software. In some implementations, the method 300 is performed by a processor executing encoded instructions stored in a non-transitory computer-readable medium (e.g., a memory). Briefly, the method 300 includes determining values indicative of power available to a device and power consumed by the device during operation, and selectively enabling and/or disabling one or more functions or features of the device based on the determined values.

The method 300 begins, at block 310, with the power control module determining a first value indicative of power available to a device from a power source. In some implementations, the first value is an analog value that indicates the power available in watts or any other unit. In some implementations, the first value is a discrete value (one of a plurality of possible values), such as '0' if the amount of power available is a low amount and '1' if the amount of power is a high amount. In some implementations, the power source delivers power to the device via an Ethernet cable.

In some implementations, determining the first value includes receiving a signal from the power source indicative of an amount of power available to the device. For example, in some implementations, the power control module receives a signal encoding a value indicative of an amount of power (e.g., in watts) available to the device and the power control module determines the first value based on the received value. For example, the first value may be the received value or the received value less a safety margin.

In some implementations, determining the first value includes receiving a signal from the power source indicative of a power standard employed by the power source in delivering power to the device. For example, in some implementations, the power control module receives a signal encoding a flag indicating that IEEE 802.3af or IEEE 802.3at is being used. As an example, the power control module may determine the first value as 12.95 W if the flag indicates that IEEE 802.3af is being used.

At block 320, the power control module determines a second value indicative of the power consumed by the device. In some implementations, the second value is indicative of the power being currently consumed by the device during operation of the device. The second value (like the first value) may be an analog value or a discrete value. In some implementations, determining the second value includes receiving data from a power consumption monitor of the device and determining the second value based on the received data. In some implementations, determining the second value comprises receiving data from one or more environmental sensors of the device and determining the second value based on the received data.

As described above, the power control module may determine the amount of power consumed by the device in a number of ways. Similarly, the power control module may determine the second value indicative of the amount of power consumed by the device in the same ways.

In some implementations, the power control module determines the second value by accessing power consumption data stored on the device indicative of expected power consumed by the device in various configurations (e.g., by various power consuming functions or having various sets of power consuming functions enabled or disabled). In some implementations, the power control module determines the second value using data indicative of actual power consumption, rather than (or in addition to) expected or designed power consumption. For example, in some implementations, the power control module determines the second value based on data received from one or more sensors. In some implementations, the power control module determines the second value based on a monitored value generated by one or more power consumption monitors. In some implementations, the power control module determines the amount of power consumed by the device based on information received over a network. For example, in some implementations, the power control module receives information from a database of live, real-time information on the status and history of devices in operation.

At block 330, the power control module determines a difference between the first value and second value. In some implementations, this difference is indicative of an amount of power that is available to be consumed by the device, but is not being consumed by the device. At block 335, the power control module determines whether to change the functionality of the device. In some implementations, the power control module makes this determination based on the difference between the first value and the second value. For example, if the difference is above a first threshold, the power control module may determine to change the functionality of the device by enabling one or more power consuming functions and the method proceeds to block 340. If the difference is below a second threshold, the power control module may determine to change the functionality of the device by disabling one or more power consuming functions and the method proceeds to block 350. If the difference is between the first and second thresholds, the power control module may determine not to change the functionality of the device and the method returns to block 320.

Attempting to draw more power than can be provided by a power source may cause failure of the device or degradation of performance of currently enabled power consuming functions. In some implementations, if a device attempts to draw more power than can be provided by a power source, the power source may cease to provide any power, resulting in failure of the device. In some implementations, if a device attempts to draw more power than can be provided, a brownout or overcurrent condition may occur that may result in failure of the device, damage to the device or the switching hub, or degradation of performance of the device.

In determining to change the functionality of the device by disabling one or more power consuming functions, the power control module avoids attempting to draw more power to the device than can be provided. In determining to change the functionality of the device by enabling one or more power consuming functions, the power control module intelligently reduces the safety margin between the power available and power consumed without attempting to draw more power to the device than can be provided while still enabling the device to reach otherwise unobtainable performance levels for a given device.

At block 340, the power control module selects one or more power consuming functions of the device to enable. The power control module may select the power consuming functions to enable in a number of ways. In some implementations, the power consuming functions is selected based on an estimated power consumption of the power consuming functions, based on information received over a network indicating priority of the power consuming functions, based on stored user preferences indicating priority of the power consuming functions, or any other information. An example method of selecting a power consuming function is described in detail below with respect to FIG. 5.

At block 345, the power control module enables the selected power consuming functions. In some implementations, enabling the selected power consuming functions includes activating (e.g., powering) hardware of the device associated with at least one of the power consuming functions. In some implementations, enabling the selected power consuming functions includes executing code (e.g., with a processor of the device) associated with at least one of the power consuming functions. In some implementations, enabling the selected power consuming functions comprises increasing or decreasing a hardware or software parameter. In some implementations, the power control module enable the selected power consuming functions by transmitting a signal (e.g., to a processor) to enable the power consuming functions.

At block 350, the power control module selects one or more power consuming functions of the device to disable. As in block 340, the power control module may select the power consuming functions to disable in a number of ways. In some implementations, the power consuming functions are selected based on an estimated power consumption of the power consuming functions, based on information received over a network indicating priority of the power consuming functions, based on stored user preferences indicating priority of the power consuming functions, or any other information. An example method of selecting a power consuming function is described in detail below with respect to FIG. 5.

At block 355, the power control module disables the selected power consuming functions. In some implementations, disabling the selected power consuming functions includes deactivating (e.g., depowering) hardware of the device associated with at least one of the power consuming functions. In some implementations, disabling the selected power consuming functions includes ceasing to execute code (e.g., with a processor of the device) associated with at least one of the power consuming functions. In some implementations, disabling the selected power consuming functions includes increasing or decreasing a hardware or software parameter. In some implementations, the power control module may disable the selected power consuming functions by transmitting a signal (e.g., to a processor) to disable the power consuming functions.

After blocks 345 and 355 (and in response to determining in block 355 not to change the functionality of the device), the method 300 returns to block 320 where the power control module determines an updated second value indicative of power consumed by the device (with one or more power consuming functions possibly enabled or disabled). The method 300 may proceed again with the power control module selecting one or more additional power consuming functions to be enabled (in block 340) or selecting one or more power consuming functions to be disabled (in block 350). The selected one or more power consuming functions to be disabled may include at least one of the power consuming functions previously enabled by an earlier iteration through the method 300. The method 300 may include enabling (in block 345) or disabling (in block 355) the update-selected power consuming function.

The method 300 returns, once again, to block 320, such that the power control module continuously monitors and controls the amount of power consumed by the device and repeatedly enables or disables power consuming functions.

Figure 4:
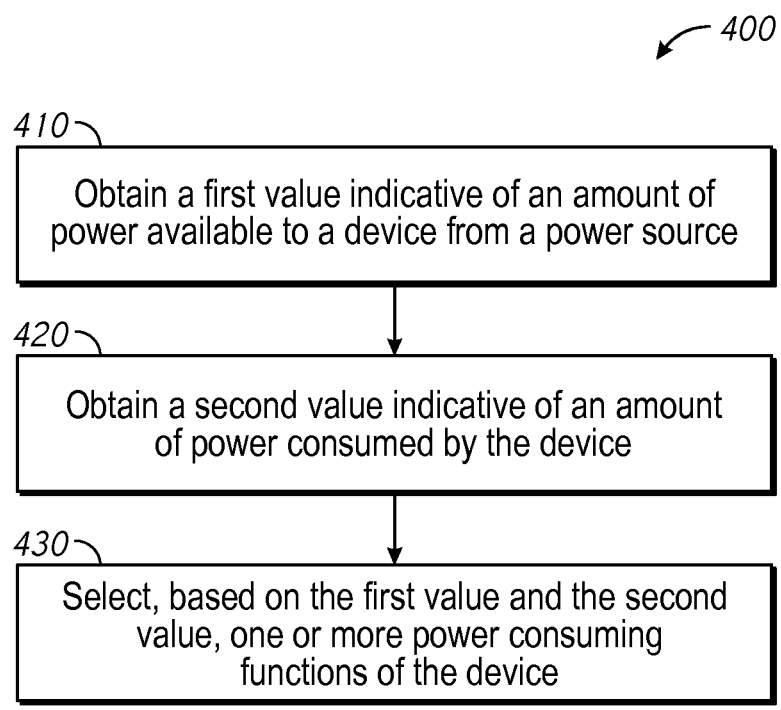
FIG. 4 is a flowchart representation of a method of managing power consumption of a device in accordance with some implementations.

FIG. 4 is a flowchart representation of a method 400 of managing power consumption of a device in accordance with some implementations. In some implementations, the method 400 is performed by a power control module of a device, such as the power control module 240 of FIG. 2A. In some implementations, the method 400 is performed by processing logic, including a suitable combination of hardware, firmware, and software. In some implementations, the method 400 is performed by a processor executing encoded instructions stored in a non-transitory computer-readable medium (e.g., a memory). Briefly, the method 400 includes obtaining values indicative of power available to a device and power consumed by the device during operation, and selecting one or more power consuming functions of the device based on the determined values in order to manage power consumption of the device.

The method 400 begins, at block 410, with the power control module obtaining a first value indicative of an amount of power (e.g., a power level) available to a device from a power source. At block 420, the power control module obtains a second value indicative of an amount of power consumed by the device. Blocks 410 and 420 may be performed as described above with respect to block 310 and 320 of FIG. 3. Although blocks 410 and 420 are described sequentially, it is appreciated that they may be performed sequentially in any order, simultaneously, or overlapping in time.

At block 430, the power control module selects one or more power consuming functions of the device based on the first value and the second value. In some implementations, the power control module selects the power consuming functions based on a difference between the first value and the second value. In some implementations, the power control module selects the power consuming functions based on the first value and the second value without determining a difference between the two values.

In some implementations, the power consuming functions are selected based on an estimated power consumption of the power consuming functions, based on information received over a network indicating priority of the power consuming functions, based on user preferences indicating priority of the power consuming functions, or any other information. An example method of selecting a power consuming function is described in detail below with respect to FIG. 5.

The method 400 may include enabling and/or disabling the selected one or more power consuming functions. Enabling the power consuming functions may be performed as described above with respect to block 345 of FIG. 3. Disabling the power consuming functions may be performed as described above with respect to block 355 of FIG. 3.

Figure 5:
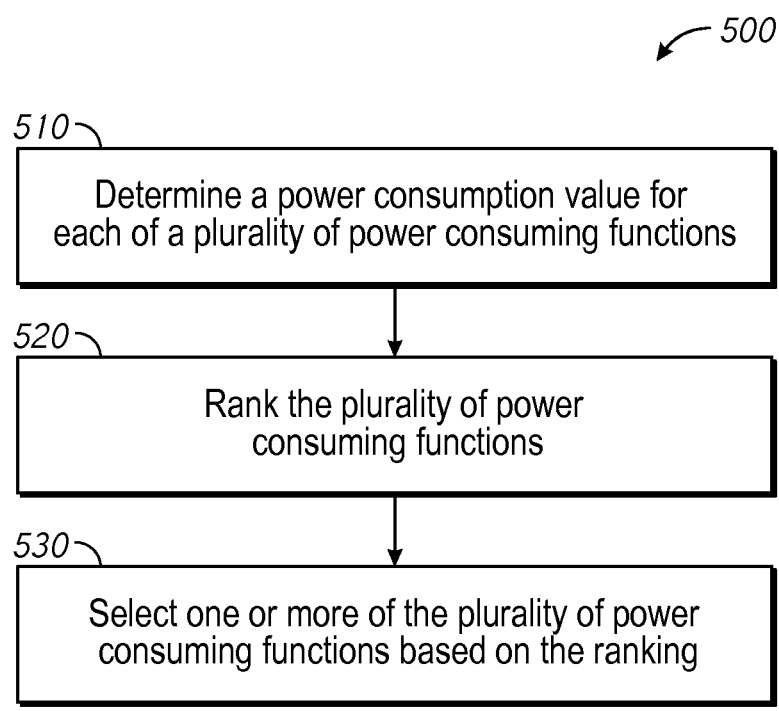
FIG. 5 is a flowchart representation of a method of selecting power consuming functions to enable or disable in accordance with some implementations.

FIG. 5 is a flowchart representation of a method 500 of selecting power consuming functions to enable or disable in accordance with some implementations. In some implementations, the method 500 is performed by a power control module of a device, such as the power control module 240 of FIG. 2A. In some implementations, the method 500 is performed by processing logic, including a suitable combination of hardware, firmware, and software. In some implementations, the method 500 is performed by a processor executing encoded instructions stored in a non-transitory computer-readable medium (e.g., a memory). Briefly, the method 500 includes determining a power consumption value for a number of power consuming functions, ranking the power consuming functions, and selecting one or more of power consuming functions based on the ranking.

The method 500 begins, at block 510, with the power control module determining a power consumption value for each of a plurality of power consuming functions. In some implementations, the power consumption value may be indicative of an amount of power consumed by the power consuming function. In some implementations, the power consumption value may be indicative of a difference between a first amount of power consumed by the device with the power consuming function enabled and a second amount of power consumed by the device with the power consuming function not enabled.

The power consumption value for each of the plurality of power consuming functions may be determined in a number of ways. In some implementations, the power consumption value is based on power consumption data stored in the device (e.g., power consumption data 241 of FIG. 2A). In some implementations, the power consumption data includes a table that associates each of the plurality of power consuming function with a power consumption value. In some implementations, the power consumption values are determined in much the same way as the amount of power consumed by the device as described above, but specific to particular power consuming functions. For example, in some implementations, the power consumption values are based on sensor data or information received over a network.

In some implementations, in order to select one or more power consuming functions to disable, the power consumption values are based on data of actual power consumption of the power consuming functions in operation. In some implementations, in order to select one or more power consuming functions to enable, the power consumption values are based on data of expected power consumption of the power consuming functions.

At block 520, the power control module ranks the plurality of power consuming functions. In some implementations, the power control module ranks the plurality of power consuming functions by providing a ranking value to each of the plurality of power consuming functions indicative of a desirability to enable (or not disable) the power consuming function. In some implementations, the ranking values are stored in a fixed table that associates each power consuming function with a ranking value. In some implementations, the ranking values may be dynamically generated by the power control module based on received information. For example, in some implementations, the ranking values are based on user preferences received by the power control module indicating desirability of particular power consuming functions (e.g., a predefined tolerable latency, a jitter limit, a suitable download rate, a suitable upload download rate, and/or another quality of service metric).

In some implementations, the ranking values are based on sensor data or data received over a network. For example, the data over the network may indicate nearby client device hardware and/or software limitations resulting in a higher ranking for range over throughput or resulting in elimination of support for a specific band or channel. As another example, the data over the network may indicate that client device density has or is predicted to increase, shifting rankings in favor or more CPU/memory power consumption over radio power consumption. In some implementations, the data received over the network may include an indication of one or more power consuming functions that are to be enabled, if possible. For example, the data received over the network may indicate that a scanning radio should be enabled to detect interference in the environment.

In some implementations, the ranking values are based on the determined power consumption values. For example, if the power consumption value for a particular power consuming function is low, the power control module may assign a higher ranking value to the power consuming function as the desirability of the power consuming function may be increased by having low power consumption.

At block 530, the power control module selects one or more of the plurality of power consuming functions based on the ranking. In some implementations, the power control module also selects the power consuming functions based on the determined power consumption values. In some implementations, the sum of the power consumption values of the selected one or more power consuming functions is less than a difference between a first value indicative of an amount of available power and a second value indicative of amount of power consumed. As an example, based on a first value indicating that the device has 14.3 W of power available and a second value indicative that the device is consuming 12.1 W, the power control module may determine that 1.2 W (i.e., 14.3 W minus 12.1 W) worth of power consuming functions are to be enabled. In some implementations, the power control module selects the highest ranked power consuming function having a power consumption value less than 1.2 W. If this leaves additional power to be used, in some implementations, the power control module additionally selects the highest ranked remaining power consuming function having a power consumption value less than the remaining additional power. As another example, the power control module may determine that 0.5 W worth of power consuming functions are to be disabled. In some implementations, the power control module selects the lowest ranking power consuming function having a power consumption value greater than 0.5 W. In some implementations, the power control module repeatedly selects the lowest ranking power consuming function until the sum of their power consumption values is greater than 0.5 W.

In some implementations, the sum of the power consumption values of the selected one or more power consuming functions is less than a difference between a first value indicative of an amount of available power and a second value indicative of amount of power consumed, with the difference reduced by a power safety margin. For example, the first value may indicate that the device has 14.3 W of power available and the second value indicative that the device is consuming 12.1 W. Rather than determining that 1.2 W worth of power consuming functions are to be enabled, the power control module may determine that only 1.0 W worth of power consuming functions are to be enabled based on a power safety margin of 0.2 W.

Figure 6:
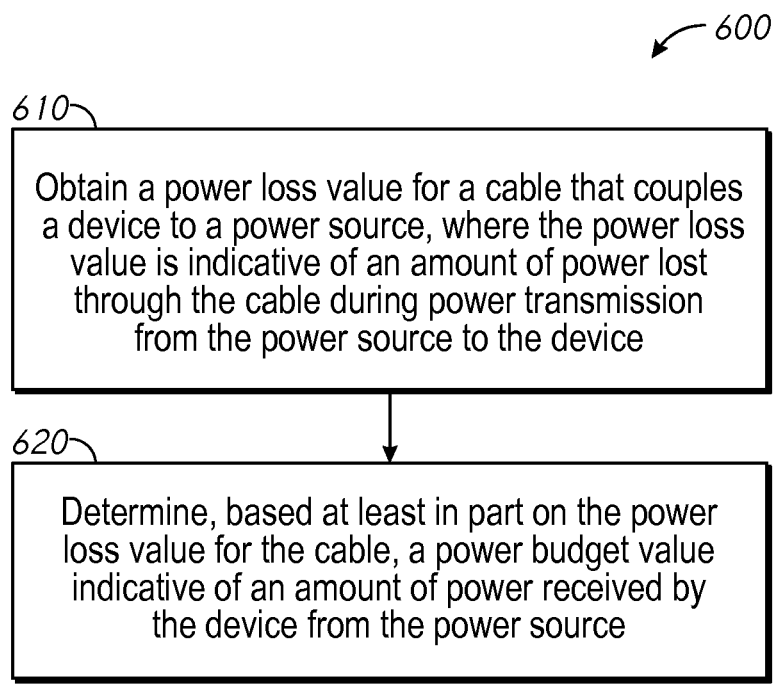
FIG. 6 is a flowchart representation of a method of determining a power budget in accordance with some implementations.

FIG. 6 is a flowchart representation of a method 600 of determining a power budget in accordance with some implementations. In some implementations, the method 600 is performed by a power control module of a device such as the power control module 240 of FIG. 2A. In some implementations, the method 600 is performed by processing logic, including a suitable combination of hardware, firmware, and software. In some implementations, the method 600 is performed by a processor executing encoded instructions stored in a non-transitory computer-readable medium (e.g., a memory). Briefly, the method 600 includes determining a power loss value for a cable, and determining a power budget value based on the power loss value.

The method 600 begins, at block 610, with the power control module or a component thereof (e.g., the cable diagnostic sub-module 245 in FIG. 2A) obtaining a power loss value for a cable that couples a device to a power source, where the power loss value is indicative of an amount of power lost through the cable during power transmission from the power source to the device. In some implementations, obtaining the power loss value comprises determining one or more characteristics of the cable by performing a diagnostic test on the cable (e.g., IEEE 802.3az), where the power loss value for the cable is a function of the one or more characteristics of the cable.

In some implementations, the power source delivers power to the device via an Ethernet cable. The IEEE 802.3az cable diagnostic standard is used to determine one or more characteristics of the cable. In some implementations, the one or more characteristics of the cable include, without limitation, a length of the cable, a resistance value of the cable, an insertion loss value of the cable, and a return loss value of the cable. In some implementations, a voltage pulse is sent by the device to determine the one or more characteristics of the cable according to IEEE 802.3az. For example, the length of the cable is determined by measuring the roundtrip time of the voltage pulse based on the velocity of a wave relative to the material of the cable (e.g., copper). For example, the category of the cable (e.g., Category 3, 5, 5e, 6, 7, etc.) is a function of the insertion loss and a return loss values of the cable. In turn, the resistance per meter of the cable is determined using a look-up-table that correlates cable categories with the typical resistance per meter for a respective cable category. Finally, the power loss value of the cable is a function of the resistance per meter and the length.

At block 620, the power control module determines, based at least in part on the power loss value for the cable, a power budget value indicative of an amount of power received by the device from the power source. In some implementations, the power budget value (sometimes also referred to herein as the "first value") is an analog value. In other implementations, the power budget value is a discrete value (one of a plurality of possible values), such as '0' if the amount of power available is a low amount and '1' if the amount of power is a high amount.

In some implementations, determining the power budget value includes adjusting a first power budget value, based at least in part on the power loss value, to a second power budget value. In some implementations, the difference between the second power budget value and the first power budget value is a function of the difference between an expected power loss value for the cable and the determined power loss value. For example, according to the IEEE 802.3af standard, the device may expect to receive 12.95 W of power via an Ethernet cable even though the power source output 15.4 W due to the worst-case scenario where the Ethernet cable is long (e.g., 100 m) and of low quality (e.g., Category 3). Continuing with this example, the expected power loss value for the Ethernet cable is 2.45 W. In reality, the device may be able to draw more power via the Ethernet cable, when the determined power loss value for the cable is less than the expected power loss value, particularly if the Ethernet cable is short or of high quality (e.g., Category 5 or above). For example, the device may be able to draw up to 13.87 W from a Category 5 cable, a 7.1% increase in the amount of power drawn as compared to 12.95 W.

In some implementations, the power control module obtains an indication of the first power budget value from the power source. For example, in some implementations, the indication is a signal that encodes the first power budget value indicative of an amount of power (e.g., in watts) available to the device, and the power control module determines the second power budget value based on the received first power budget value and the power loss value for the cable that couples the device to the power source. For example, the first power budget value may be the received first power budget value or the received first power budget value less a safety margin.

In some implementations, the power control module obtains a signal from the power source indicative of a power standard of the device. For example, in some implementations, the power control module receives a signal encoding a flag indicating that IEEE 802.3af or IEEE 802.3at is being used. As an example, the power control module may determine the first power budget value as 12.95 W if the flag indicates that IEEE 802.3af is being used.

In some implementations, the power control module reads the first power budget value from memory that is local to or remote from the device (e.g., a register of the power source). In some implementations, the power control module reads the power standard of the device from memory that is local to or remote from the device (e.g., a register of the power source). For example, in some implementations, the power control module reads a flag indicating that IEEE 802.3af or IEEE 802.3at is employed by the device. As an example, the power control module may determine the first power budget value as 12.95 W if the flag indicates that IEEE 802.3af is employed by the device. For example, the first power budget value or the power standard is programmed into the device's firmware or is stored in a look-up table by the manufacturer.

In some implementations, after block 620, the method 600 continues with the power control module identifying a first set of currently operating power consuming functions of the device and determining, based at least in part on the first set of power consuming functions, a cumulative power consumption value (sometimes also referred to herein as the "second value") indicative of an amount of power utilized by the first set of power consuming functions of the device. Determining the cumulative power consumption value may be performed as described above with respect to the second value of block 320 of FIG. 3. The power control modules selects, based at least in part on the power budget value and the cumulative power consumption value, a second set of power consuming functions and effects the second set of power consuming functions, including at least one of: enabling a new power consuming function not included in the first set of power consuming functions, disabling a respective one of the first set of power consuming functions, increasing a power allocation for a respective power consuming function of the first set of power consuming functions, or decreasing power allocation for a respective power consuming function of the first set of power consuming functions.

In some implementations, after effecting the second set of power consuming functions as described above, the method 600 continues with the power control module determining an updated total power consumption value indicative of an amount of power consumed by the device. The method 600 continues with the power control selecting, based at least in part on the second power budget value and the updated total power consumption value, one or more power consuming functions of the device. In some implementations, the one or more selected functions may be the same power consuming functions selected above and/or new power consuming functions. In some implementations, the power control module disables the one or more selected power consuming functions in response to determining that the updated total power consumption value is greater than the power budget value. In some implementations, the power control module enables the one or more selected power consuming functions in response to determining that the updated total power consumption value is less than the power budget value.

In some implementations, after block 620, the method 600 continues with the power control module determining a total power consumption value (sometimes also referred to herein as the "second value") indicative of an amount of power consumed by the device and selecting, based at least in part on the power budget value and the total power consumption value, one or more power consuming functions of the device. The power control module enables and/or disables the one or more selected power consuming functions of the device. Determining the total power consumption value may be performed as described above with respect the second value of block 320 of FIG. 3. Selecting the one or more power consuming functions may be performed as described above with respect block 420 of FIG. 4. An example method of selecting one or more power consuming functions is described in detail below with respect to FIG. 5. Enabling the power consuming functions may be performed as described above with respect to block 345 of FIG. 3. Disabling the power consuming functions may be performed as described above with respect to block 355 of FIG. 3.

In some implementations, enabling and/or disabling the one or more selected power consuming functions as described above, the method 600 continues with the power control module determining an updated total power consumption value indicative of an amount of power consumed by the device. The method 600 continues with the power control selecting, based at least in part on the second power budget value and the updated total power consumption value, one or more power consuming functions of the device. In some implementations, the one or more selected functions may be the same power consuming functions selected above and/or new power consuming functions. In some implementations, the power control module disables the one or more selected power consuming functions in response to determining that the updated total power consumption value is greater than the power budget value. In some implementations, the power control module enables the one or more selected power consuming functions in response to determining that the updated total power consumption value is less than the power budget value.

Figure 7:
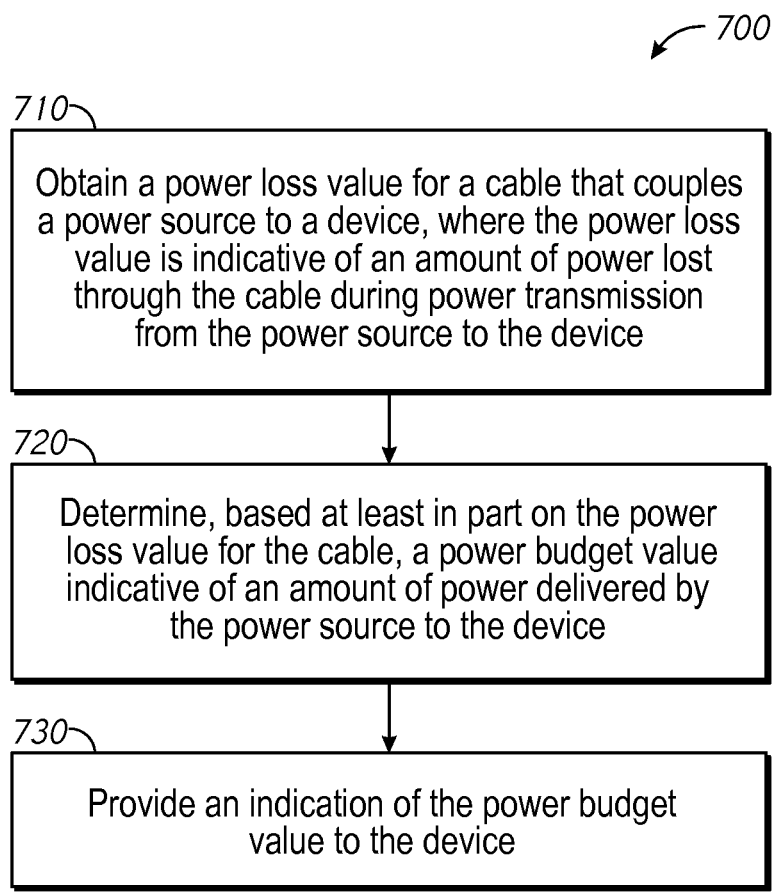
FIG. 7 is a flowchart representation of a method of determining a power budget in accordance with some implementations.

FIG. 7 is a flowchart representation of a method 700 of determining a power budget in accordance with some implementations. In some implementations, the method 700 is performed by a power supply module of a power source such as the power supply module 290 in FIG. 2B. In some implementations, the method 700 is performed by processing logic, including a suitable combination of hardware, firmware, and software. In some implementations, the method 700 is performed by a processor executing encoded instructions stored in a non-transitory computer-readable medium (e.g., a memory). Briefly, the method 700 includes determining a power loss value for a cable, and determining a power budget based on the power loss value.

The method 700 begins, at block 710, with the power supply module or a component thereof (e.g., the cable diagnostic sub-module 294 in FIG. 2B) obtaining a power loss value for a cable that couples a power source to a device, where the power loss value is indicative of an amount of power lost through the cable during power transmission from the power source to the device. Obtaining the power loss value for the cable that couples the power source to the device may be performed as described above with respect to block 610 of FIG. 6.

At block 720, the power supply module determines, based at least in part on the power loss value for the cable, a power budget value indicative of an amount of power delivered to the device by the power source. In some implementations, the power budget value (sometimes also referred to herein as the "first value") is an analog value. In other implementations, the power budget value is a discrete value (one of a plurality of possible values), such as '0' if the amount of power available is a low amount and '1' if the amount of power is a high amount.

In some implementations, the power supply module or a component thereof (e.g., the power standard sub-module 292 in FIG. 2B) determines a power standard by which the device is able to source power (e.g., IEEE 802.3af, IEEE 802.3at, or IEEE 802.3bt). In some implementations, the power supply module determines a first power budget value based on the power standard (e.g., 12.95 W for IEEE 802.3af) and adjusts the first power budget value to a second power budget value based on the power loss value. In some implementations, the difference between the second power budget value and the first power budget value is a function of the difference between an expected power loss value for the cable and the determined power loss value. For example, according to the IEEE 802.3af standard, the device may expect to receive 12.95 W of power via an Ethernet cable even though the power source output 15.4 W due to the worst-case scenario where the Ethernet cable is long (e.g., 100 m) and of low quality (e.g., Category 3). Continuing with this example, the expected power loss for the Ethernet cable is 2.45 W. In reality, the device may be able to draw more power via the Ethernet cable, if the determined power loss value for the cable is less than the expected power loss value, particularly if the Ethernet cable is short or of high quality (e.g., Category 5 or above).

At block 730, the power supply module provides an indication of the power budget value to the device. In some implementations, the indication is a signal that encodes one or more of a power budget value indicative of an amount of power (e.g., in watts) available to the respective device, the power standard of the device, and the power loss value of the cable that couples the device to the power source.

Figure 8:
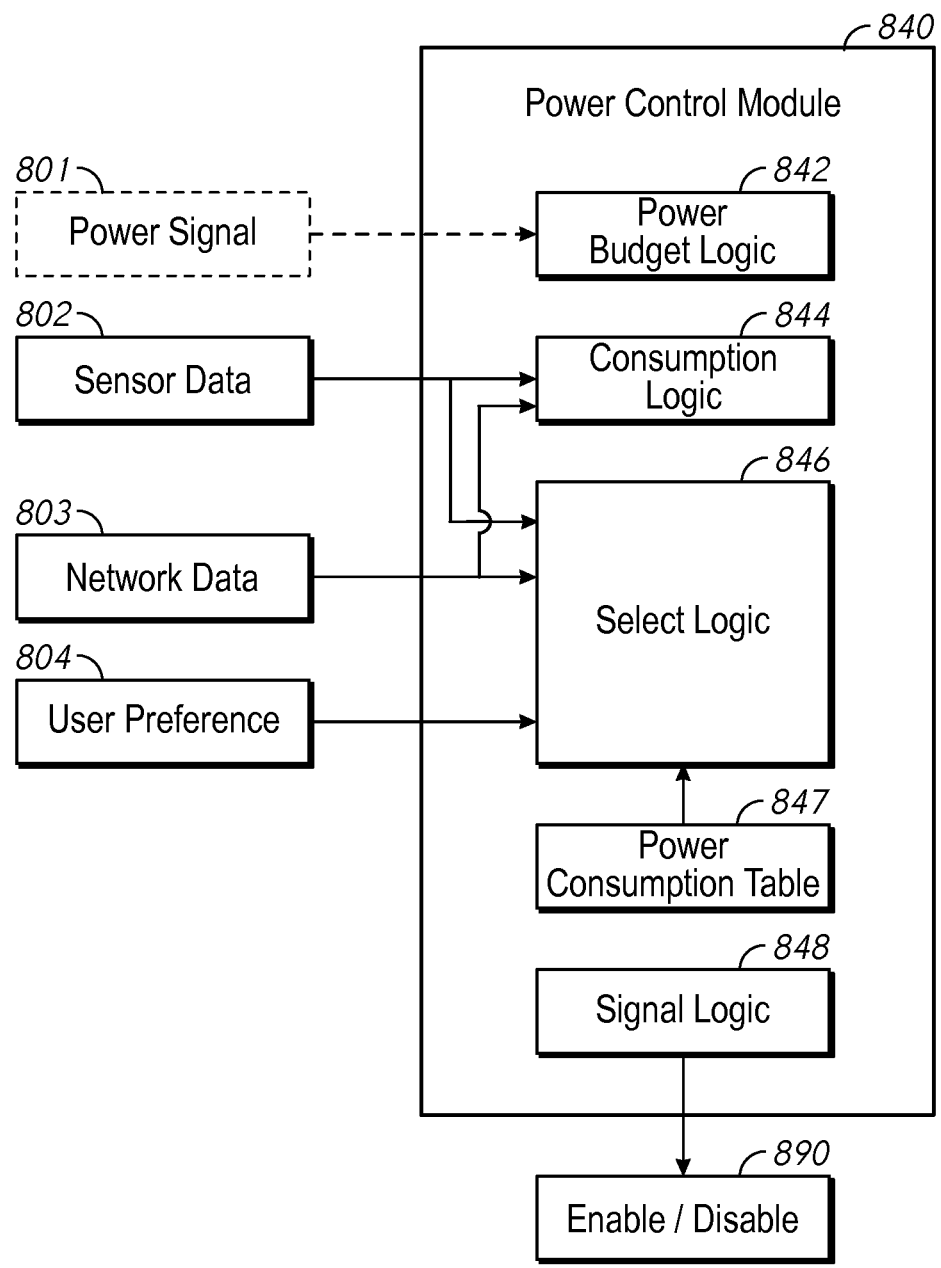
FIG. 8 is a block diagram of a power control module in accordance with some implementations.

FIG. 8 is a block diagram of a power control module 840 in accordance with some implementations. FIG. 8 illustrates various inputs that may be provided to the power control module 840 and various logic components thereof and an output that may be provided by the power control module 840. The power control module 840 (and the various sub-modules thereof) may be implemented via hardware, software, firmware, or a combination thereof.

The power control module 840 includes power budget logic 842 that is configured to obtain a first value indicative of an amount of power available to a device from a power source. In some implementations, the power budget logic 842 obtains the first value based on a received power signal 801 indicative of an amount of power available to the device. In some implementations, the power signal 801 encodes a value indicative of an amount of power available to the device (e.g., in watts). In some implementations, the power signal 801 encodes a flag indicative of a power standard (e.g., IEEE 802.3af or IEEE 802.3at) employed by the power source in delivering power to the device. The power budget logic 842 may perform block 410 as described above with respect to FIG. 4.

In some implementations, the power budget logic 842 is configured to determine, based at least in part on a power loss value for a cable, a power budget value (i.e., the first value) indicative of an amount of power received by the device from the power source. The power budget logic 842 may perform block 610, as described above with respect to FIG. 6, to obtain the power loss value. Furthermore, the power budget logic 842 may also perform block 620, as described above with respect to FIG. 6, to determine the power budget value (i.e., the first value indicative of the amount of power available to the device from the power source).

The power control module 840 includes power consumption logic 844 that is configured to obtain a second value indicative of an amount of power consumed by the device. In some implementations, the power consumption logic 844 determines the second value based on a received signal from a sensor including sensor data 802. In some implementations, the power consumption logic 844 determines the second value based on a received signal over a network including network data 803. For example, in some implementations, the sensor data 802 includes data from one or more power consumption monitors. As another example, in some implementations, the network data 803 includes information from a database of live, real-time information on the status and history of devices in operation. The power consumption logic 844 may perform block 420 as described above with respect to FIG. 4.

The power control module 840 includes select logic 846 that is configured to select one or more power consuming functions of the device based on the first value and the second value. In some implementations, the select logic 846 determines power consumption values for each of a plurality of power consuming functions using the sensor data 802, network data 803, and/or information in a power consumption table 847 associating each of the plurality of power consuming functions with a power consumption value. In some implementations, the select logic 846 ranks the plurality of power consuming functions and selects one or more of the power consuming functions based on the ranking. The select logic 846 may perform block 430 as described above with respect to FIG. 4 and/or method 500 as described above with respect to FIG. 5.

The power control module 840 includes signal logic 848 that is configured to transmit an enable/disable signal 890 to enable or disable the selected one or more power consuming functions. The signal logic 848 may perform block 345 or 355 as described above with respect to FIG. 3.

Figure 9:
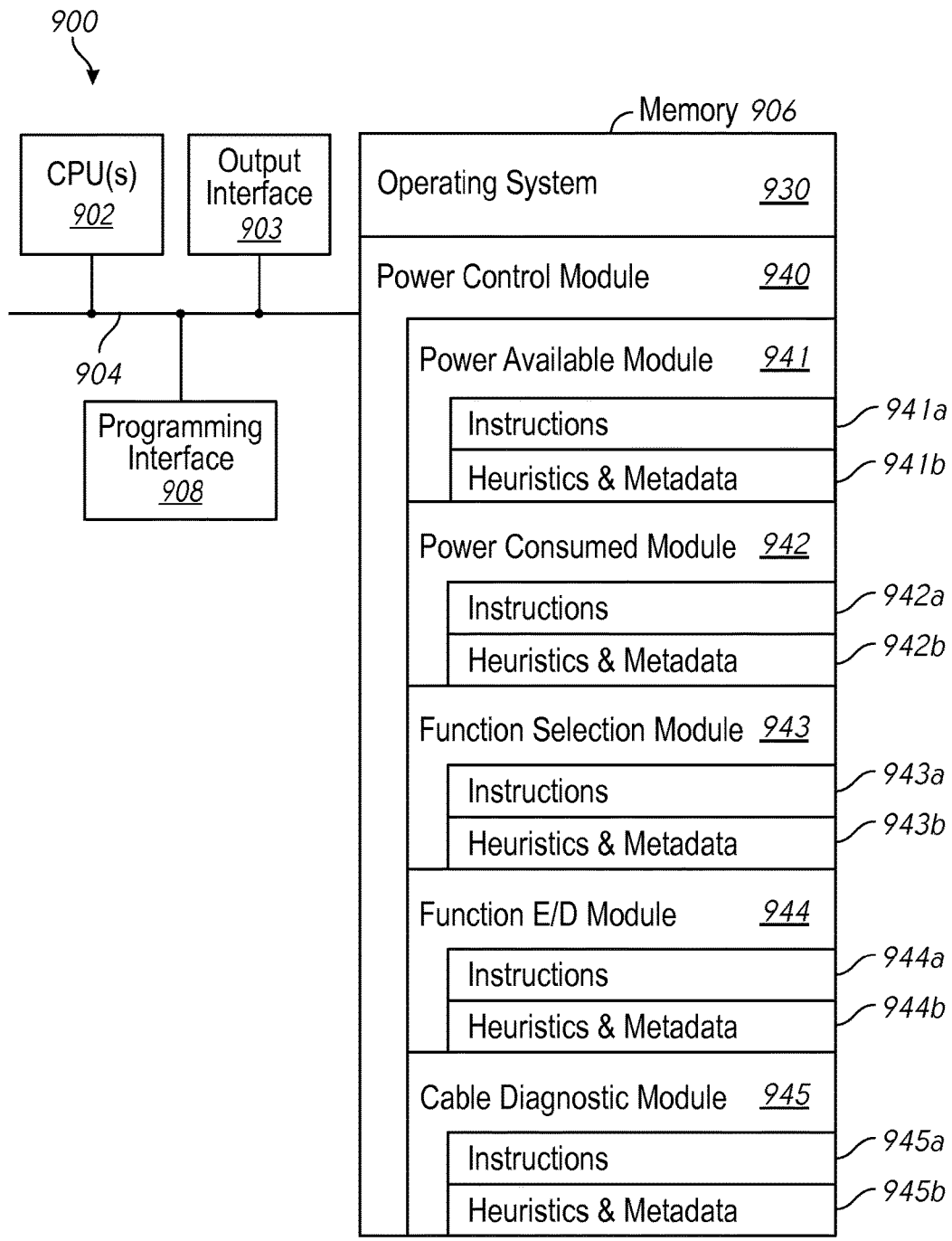
FIG. 9 is a block diagram of a computing device in accordance with some implementations.

FIG. 9 is a block diagram of a computing device 900 in accordance with some implementations. For example, in some implementations, the computing device 900 is a representation of a respective one of the one or more devices 221-1, . . . , 221-N in FIG. 2B. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the computing device 900 includes one or more processing units (CPU's) 902 (e.g., processors), one or more output interfaces 903, a memory 906, a programming interface 908, and one or more communication buses 904 for interconnecting these and various other components.

In some implementations, the communication buses 904 include circuitry that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some implementations, the memory 906 or the non-transitory computer readable storage medium of the memory 906 stores the following programs, modules and data structures, or a subset thereof including an optional operating system 930 and a power control module 940. In some embodiment, one or more instructions are included in a combination of logic and non-transitory memory. The operating system 930 includes procedures for handling various basic system services and for performing hardware dependent tasks. In some implementations, the power control module 940 is configured to selectively enable and disable power consuming functions of a device (which may include the computing device 900 or be separate from the computing device 900) based on information indicative of power available to the device and power consumed by the device. To that end, the power control module 940 includes a power available module 941, a power consumed module 942, a function selection module 943, a function enable/disable module 944, and a cable diagnostic module 945.

In some implementations, the power available module 941 is configured to obtain a first value indicative of power available to the device from a power source. To that end, the power available module 941 includes a set of instructions 941*a* and heuristics and metadata 941*b*. In some implementations, the power consumed module 942 is configured to obtain a second value indicative of power consumed by the device. To that end, the power consumed module 942 includes a set of instructions 942*a* and heuristics and metadata 942*b*. In some implementations, the function selection module 943 is configured to select one or more power consuming functions of the device based on the first value and second value in order to manage power consumption of the device. In some implementations, the function selection module 943 selects the power consuming functions based on a difference between the first value and the second value. To that end, the function selection module 943 includes a set of instructions 943*a* and heuristics and metadata 943*b*. In some implementations, the function enable/disable module 944 is configured to enable or disable the selected functions. To that end, the function enable/disable module 944 includes a set of instructions 944*a* and heuristics and metadata 944*b*.

In some implementations, the cable diagnostic module 945 is configured to obtain a power loss value for a cable that couples the device to the power source, where the power loss value is indicative of an amount of power lost through the cable during power transmission from the power source to the device. To that end, the cable diagnostic module 945 includes a set of instructions 945*a* and heuristics and metadata 945*b*. In some implementations, the power available module 941 is configured to determine, based on the power loss value obtained by the cable diagnostic module 945, a power budget value indicative of an amount of power received by the device from the power source.

Although the power control module 940, the power available module 941, the power consumed module 942, the function selection module 943, the function enable/disable module 944, and the cable diagnostic module 945 are illustrated as residing on a single computing device 900, it should be understood that in other implementations, any combination of the power control module 940, the power available module 941, the power consumed module 942, the function selection module 943, the function enable/disable module 944, and the cable diagnostic module 945 may reside in separate computing devices. For example, each of the power control module 940, the power available module 941, the power consumed module 942, the function selection module 943, the function enable/disable module 944, and the cable diagnostic module 945 may reside on a separate computing device.

Moreover, FIG. 9 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software and/or firmware chosen for a particular embodiment.

Figure 10:
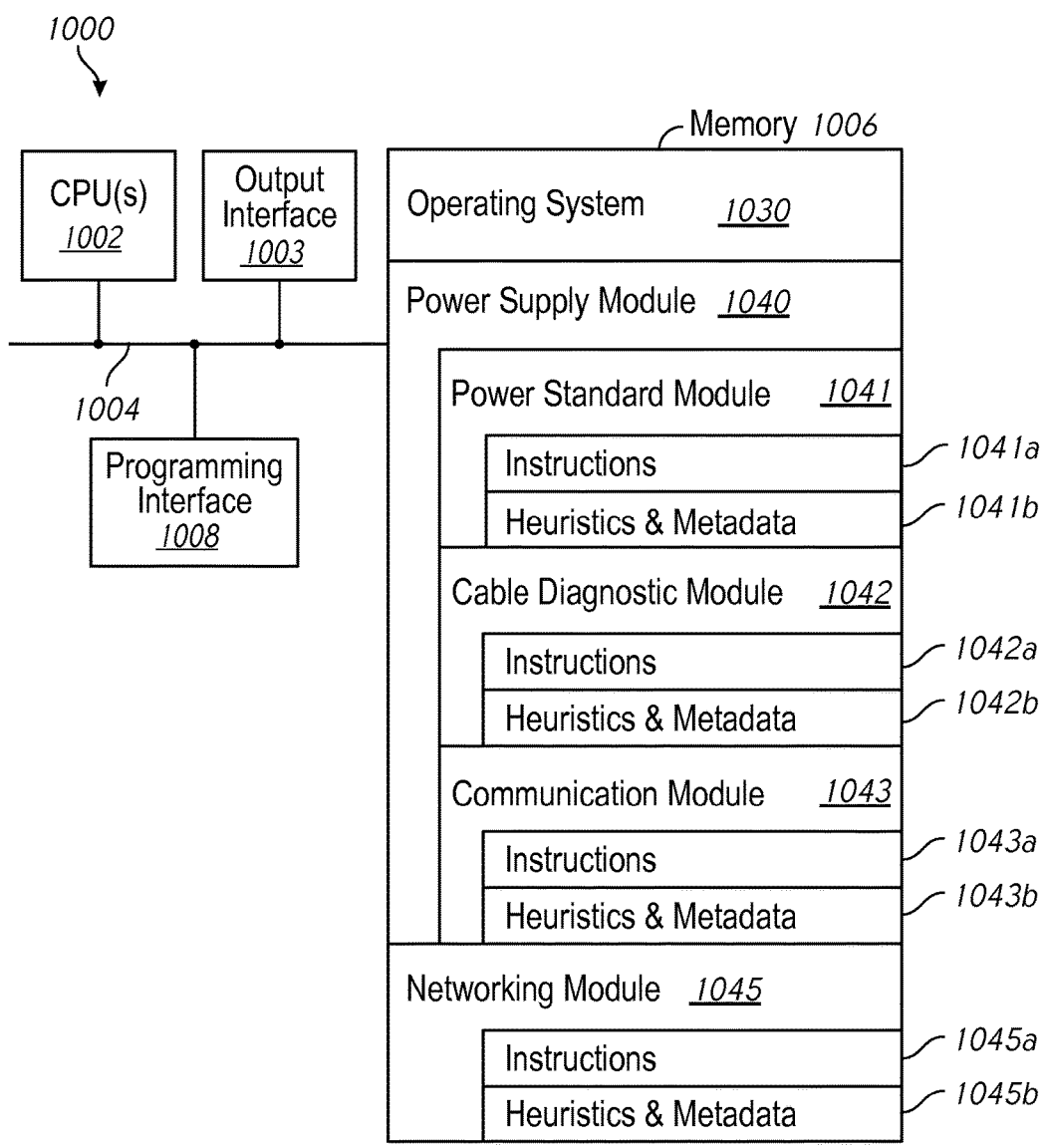
FIG. 10 is a block diagram of a computing device in accordance with some implementations.

FIG. 10 is a block diagram of a computing device 1000 in accordance with some implementations. For example, in some implementations, the computing device 1000 is a representation of the power source 211 in FIG. 2B. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the computing device 1000 includes one or more processing units (CPU's) 1002 (e.g., processors), one or more output interfaces 1003, a memory 1006, a programming interface 1008, and one or more communication buses 1004 for interconnecting these and various other components.

In some implementations, the communication buses 1004 include circuitry that interconnects and controls communications between system components. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 comprises a non-transitory computer readable storage medium. Moreover, in some implementations, the memory 1006 or the non-transitory computer readable storage medium of the memory 1006 stores the following programs, modules and data structures, or a subset thereof including an optional operating system 1030, a power supply module 1040, and, optionally, a networking module 1045. In some embodiment, one or more instructions are included in a combination of logic and non-transitory memory. The operating system 1030 includes procedures for handling various basic system services and for performing hardware dependent tasks.

In some implementations, the power supply module 1040 is configured to control the delivery of power to one or more devices (e.g., the computing device 900 in FIG. 9) coupled to the computing device 1000. To that end, the power supply module 1040 includes a power standard module 1041, a cable diagnostic module 1042, and a communication module 1043.

In some implementations, the power standard module 1041 is configured to determine a power standard by which a respective device (e.g., the computing device 900 in FIG. 9) is able to source power via a transmission medium (e.g., an Ethernet cable). To that end, the power standard module 1041 includes a set of instructions 1041a and heuristics and metadata 1041b. In some implementations, the cable diagnostic module 1042 is configured to determine a power loss value for a cable that couples the computing device 1000 to the respective device (e.g., the computing device 900 in FIG. 9) by performing a diagnostic test on the cable (e.g., using IEEE 802.3az). To that end, the cable diagnostic module 1042 includes a set of instructions 1042a and heuristics and metadata 1042b. In some implementations, the communication module 1043 is configured to send a signal indicative of power available from the computing device 1000 to the respective device (e.g., the computing device 900 in FIG. 9). To that end, the communication module 1043 includes a set of instructions 1043a and heuristics and metadata 1043b.

In some implementations, the networking module 1045 is configured to route packet traffic to and from the respective device (e.g., the computing device 900 in FIG. 9). To that end, the networking module 1045 includes a set of instructions 1045a and heuristics and metadata 1045b.

Although the power supply module 1040, the power standard module 1041, the cable diagnostic module 1042, the communication module 1043, and the networking module 1045 are illustrated as residing on a single computing device 1000, it should be understood that in other implementations, any combination of the power supply module 1040, the power standard module 1041, the cable diagnostic module 1042, the communication module 1043, and the networking module 1045 may reside in separate computing devices. For example, each of the power supply module 1040, the power standard module 1041, the cable diagnostic module 1042, the communication module 1043, and the networking module 1045 may reside on a separate computing device.

Moreover, FIG. 10 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a power receiving device configured to be connected to a power source via a cable;
      obtaining, at the power receiving device, a power loss value for the cable, wherein the power loss value is indicative of an amount of power lost through the cable during power transmission from the power source to the power receiving device;
      determining, at the power receiving device, based at least in part on the power loss value for the cable, a power budget value indicative of an amount of power received by the power receiving device from the power source;
      determining, at the power receiving device, a total power consumption value indicative of an amount of power consumed by the power receiving device;
      selecting, at the power receiving device, based at least in part on the power budget value and the total power consumption value, a plurality of power consuming functions of the power receiving device; and
      at least one of enabling and disabling, at the power receiving device, one or more of the plurality of power consuming functions for operation of the power receiving device when it is connected to the power source via the cable and receiving power from the power source.

2. The method of claim 1, wherein determining the power budget value includes adjusting a first power budget value, based at least in part on the power loss value, to a second power budget value.

3. The method of claim 2, further comprising:
   receiving a signal from the power source indicative of a power standard of the power receiving device; and
   determining the first power budget value based at least in part on the power standard.

4. The method of claim 2, further comprising:
   receiving a signal from the power source indicative of the first power budget value.

5. The method of claim 2, further comprising:
   obtaining from memory the first power budget value.

6. The method of claim 2, further comprising:
   obtaining from memory a power standard of the power receiving device; and
   determining the first power budget value based at least in part on the power standard.

7. The method of claim 1, wherein the cable is at least one of an Ethernet cable, a Universal Serial Bus cable, and a FIREWIRE cable.

8. The method of claim 1, wherein obtaining the power loss value comprises:
   determining one or more characteristics of the cable by performing a diagnostic test on the cable; and
   wherein the power loss value for the cable is a function of the one or more characteristics of the cable.

9. The method of claim 8, wherein each of the one or more characteristics are one of:
   a length of the cable;
   a resistance of the cable;
   an insertion loss value of the cable; and
   a return loss value of the cable.

10. The method of claim 1, wherein obtaining the power loss value for the cable comprises receiving a signal from the power source indicative of the power loss value for the cable.

11. The method of claim 1, further comprising:
    identifying a first set of currently operating power consuming functions of the power receiving device;
    determining, based at least in part on the first set of power consuming functions, a cumulative power consumption value indicative of an amount of power utilized by the first set of power consuming functions of the power receiving device;
    selecting, based at least in part on the power budget value and the cumulative power consumption value, a second set of power consuming functions; and
    effecting the second set of power consuming functions, including at least one of: enabling a new power consuming function not included in the first set of power consuming functions, disabling a respective one of the first set of power consuming functions, increasing a power allocation for a respective power consuming function of the first set of power consuming functions, or decreasing power allocation for a respective power consuming function of the first set of power consuming functions.

12. The method of claim 1, wherein selecting the one or more power consuming functions comprises:

determining a power consumption value for each of a plurality of power consuming functions;

ranking the plurality of power consuming functions; and selecting, based on the ranking, the one or more power consuming functions, wherein the sum of the power consumption values of the one or more power consuming functions is less than a difference between the power budget value and the total power consumption.

13. The method of claim 12, wherein ranking the plurality of power consuming functions is based on data received over a network.

14. The method of claim 12, wherein ranking the plurality of power consuming functions is based on the satisfaction of a user experience metric.

15. The method of claim 12, wherein ranking the plurality of power consuming functions is based on at least one of the determined power consumption values.

16. The method of claim 12, wherein the sum of the power consumption values of the one or more power consuming functions is less than the difference between the power budget value and the total power consumption, reduced by a power safety margin.

17. The method of claim 1, further comprising:
determining an updated total power consumption value indicative of an amount of power consumed by the power receiving device based on at least one of enabling and disabling the one or more selected power consuming functions of the power receiving device;

selecting, based at least in part on the power budget value and the updated total power consumption value, one or more power consuming functions of the power receiving device;

disabling the one or more selected power consuming functions in response to determining that the updated total power consumption value is greater than the power budget value; and enabling the one or more selected power consuming functions in response to determining that the updated total power consumption value is less than the power budget value.

18. A power receiving device comprising:
a port configured to connect to a cable to receive power from a power source;

a power sensor configured to obtain a power loss value for the cable, wherein the power loss value is indicative of an amount of power lost through the cable during power transmission from the power source to the power receiving device;

and a controller configured to:
determine, based at least in part on the power loss value for the cable, a power budget value indicative of an amount of power received by the power receiving device from the power source, determine a total power consumption value indicative of an amount of power consumed by the power receiving device;

select, based at least in part on the power budget value and the total power consumption value, a plurality of power consuming functions of the power receiving device; and at least one of enable and disable one or more of the plurality of power consuming functions for operation of the power receiving device when it is connected to the power source via the cable and receiving power from the power source.

19. The power receiving device of claim 18, wherein the controller is further configured to:
identify a first set of currently operating power consuming functions of the power receiving device;

determine, based at least in part on the first set of power consuming functions, a cumulative power consumption value indicative of an amount of power utilized by the first set of power consuming functions of the power receiving device;

select, based at least in part on the power budget value and the cumulative power consumption value, a second set of power consuming functions; and effect the second set of power consuming functions, including at least one of:

enable a new power consuming function not included in the first set of power consuming functions, disabling a respective one of the first set of power consuming functions, increasing a power allocation for a respective power consuming function of the first set of power consuming functions, or decreasing power allocation for a respective power consuming function of the first set of power consuming functions.

20. The power receiving device of claim 18, wherein the controller is further configured to:
determine an updated total power consumption value indicative of an amount of power consumed by the power receiving device based on at least one of enabling and disabling the one or more selected power consuming functions of the power receiving device;

select, based at least in part on the power budget value and the updated total power consumption value, one or more power consuming functions of the power receiving device;

disable the one or more selected power consuming functions in response to determining that the updated total power consumption value is greater than the power budget value; and enable the one or more selected power consuming functions in response to determining that the updated total power consumption value is less than the power budget value.

* * * * *